July 5, 1949.  A. C. COUTANT ET AL  2,474,972
CINEMATOGRAPHIC CAMERA
Filed Nov. 13, 1947  4 Sheets-Sheet 1

Inventors
Andre Clement Coutant
Jacques Mathot
By Robert E. Burns
Attorney

July 5, 1949. A. C. COUTANT ET AL 2,474,972
CINEMATOGRAPHIC CAMERA
Filed Nov. 13, 1947 4 Sheets-Sheet 2
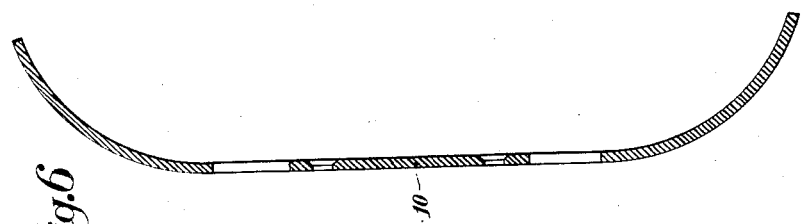
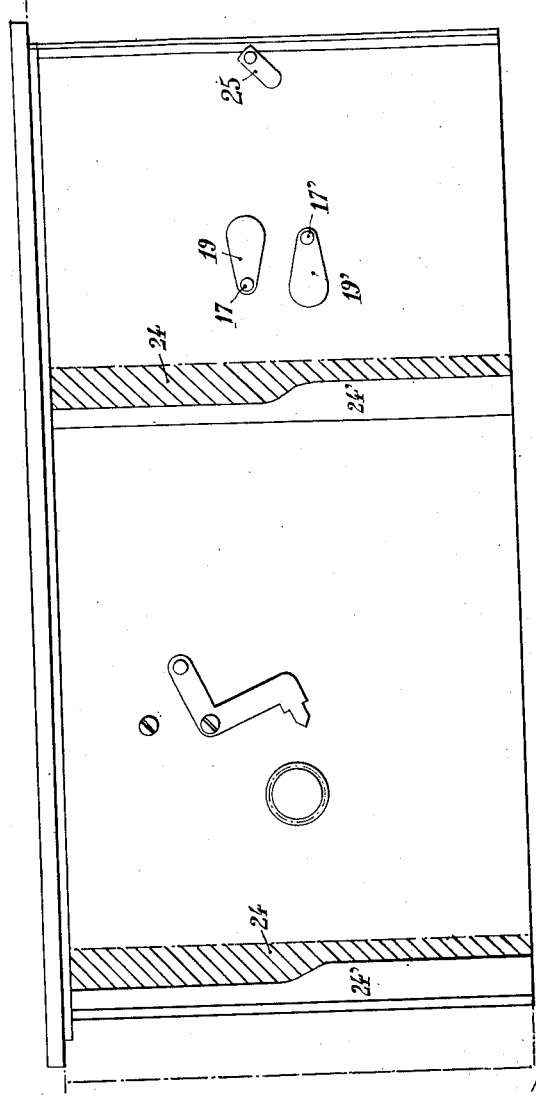
Inventors
Andre Clement Coutant
Jacques Mathot
By Robert E. Burns
Attorney July 5, 1949. A. C. COUTANT ET AL 2,474,972
CINEMATOGRAPHIC CAMERA
Filed Nov. 13, 1947 4 Sheets-Sheet 3
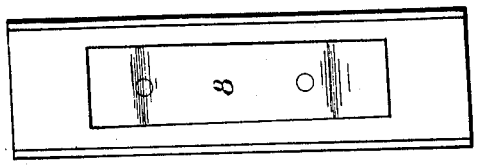
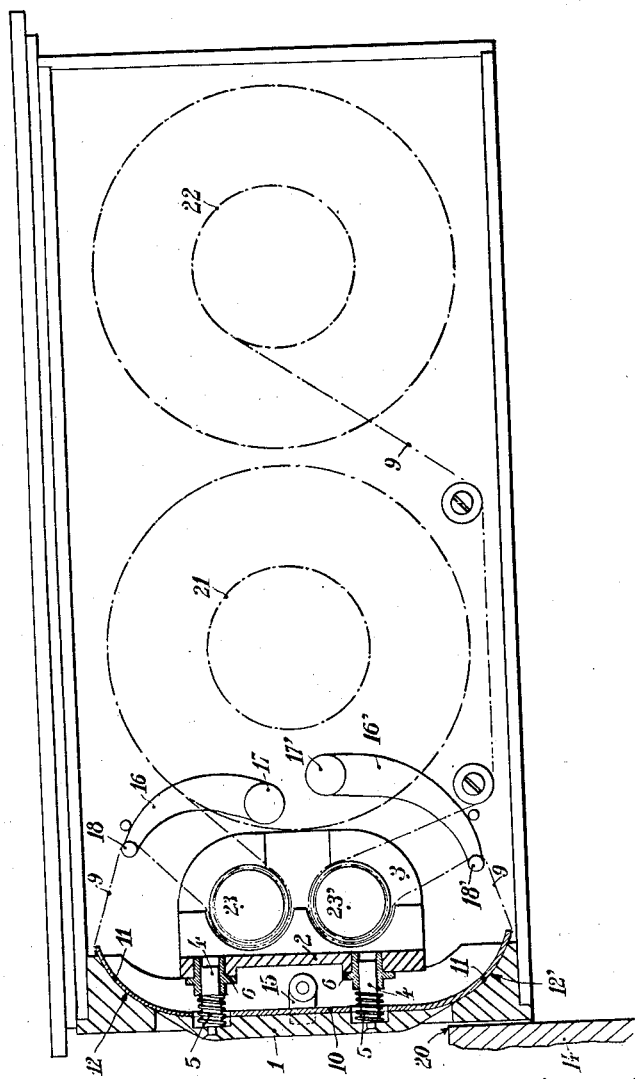
Inventors
Andre Clement Coutant
Jacques Mathot
By Robert E Burns
Attorney July 5, 1949.  A. C. COUTANT ET AL  2,474,972
CINEMATOGRAPHIC CAMERA
Filed Nov. 13, 1947  4 Sheets-Sheet 4
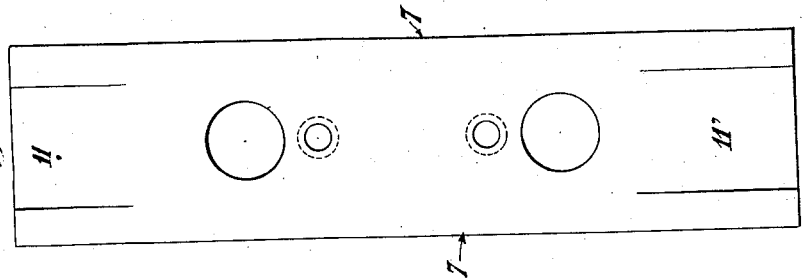
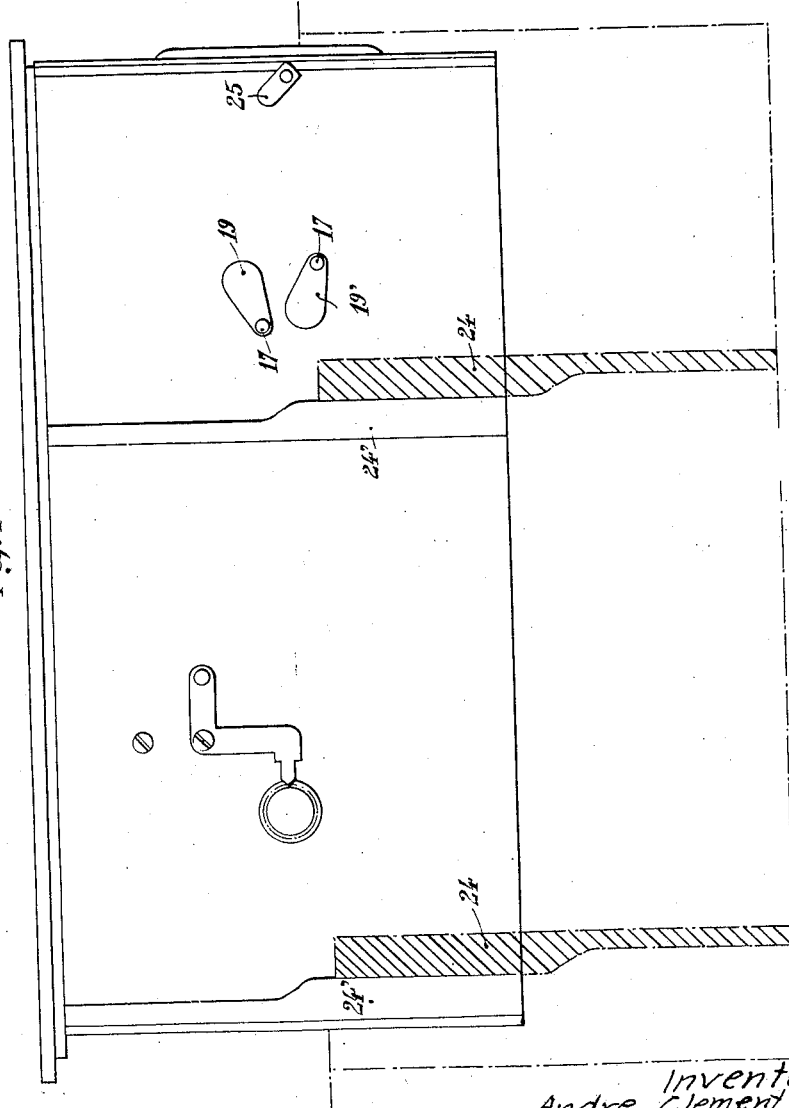
Inventors
Andre Clement Coutant
Jacques Mathot
By Robert E. Burns
Attorney Patented July 5, 1949

2,474,972

UNITED STATES PATENT OFFICE 2,474,972

CINEMATOGRAPHIC CAMERA

André Clément Coutant and Jacques Mathot, Paris, France

Application November 13, 1947, Serial No. 785,617
In France November 27, 1946

1 Claim. (Cl. 88—17)

A copending application filed on December 27, 1946, Serial No. 718,742, which is a continuation in part of application filed May 19, 1945, Serial No. 617,429 has for its object improvements in cinematographic cameras which consist notably in providing the same with a detachable light-tight loading box which contains the reels and the feed sprocket roller and whose front face constitutes the rear wall of the gate through which the straight portion of the film is fed in front of the shooting window, the other wall of said gate being constituted by the rear face of the camera itself.

The film which unwinds from the pay-off reel runs over the feed sprocket roller, forms a loop, comes out of the loading box through a slit provided for that purpose, passes to the outside of the loading box in contact with the rear face of the gate before the pressing member, enters the loading bow through an additional slit, forms a loop, runs over the feed sprocket roller and is wound on the take-up reel; removable fingers are provided to close the slits as long as the loading box is not attached to the camera proper; light-tight seals provided for that purpose at the front of the loading box and the rear of the camera provide for light-tightness as soon as the connection is completed and the shutters will then retract to give free passage to the film through the slits considered.

The present invention has for its object improvements in apparatus thus designed and more particularly in the loading boxes for the same.

Thus, according to a first feature of the invention, the movable shutters are constituted by upward and downward extensions of the pressing member; they provide for light-tightness as long as the loading box is disconnected and retract to give a free passage to the film through the slits as soon as the loading box is secured to the camera and the pressing member is yieldingly pushed backwards by the rear face of the camera that constitutes the front wall of the gate. The result is a much simpler design and a substantial decrease in the number of parts constituting the camera.

According to another feature of the invention, removable fingers are provided by means of which the cameraman can stretch the film between the feed sprocket roller and the film outlet slit on one hand and between the film inlet slit and the film feed sprocket roller on the other hand. Said fingers are arranged to retract automatically as soon as the loading box is attached to the camera, in such manner that those portions of the film that were run thereabout will henceforth constitute loops having the desired size. Owing to this arrangement it becomes easier for the cameraman to reload his loading box, even in a completely dark room, while he is certain that the loops necessary for good operation will always and automatically be obtained.

An embodiment of the present invention in the case of a camera intended to be mounted in an airplane wing and comprising a loading box or magazine to be fitted on the inside of the camera is illustrated by way of example in the appended drawing; in this particular type of apparatus, in order to facilitate the replacement of the loading box, same is removed and a new one is set in position by a sliding upward or downward motion at right angles to the optical axis of the camera.

Figure 2 is an elevational side view of the same loading box in its operative position, the front side of the camera being supposed to be at the right of the figure.

Figure 1:
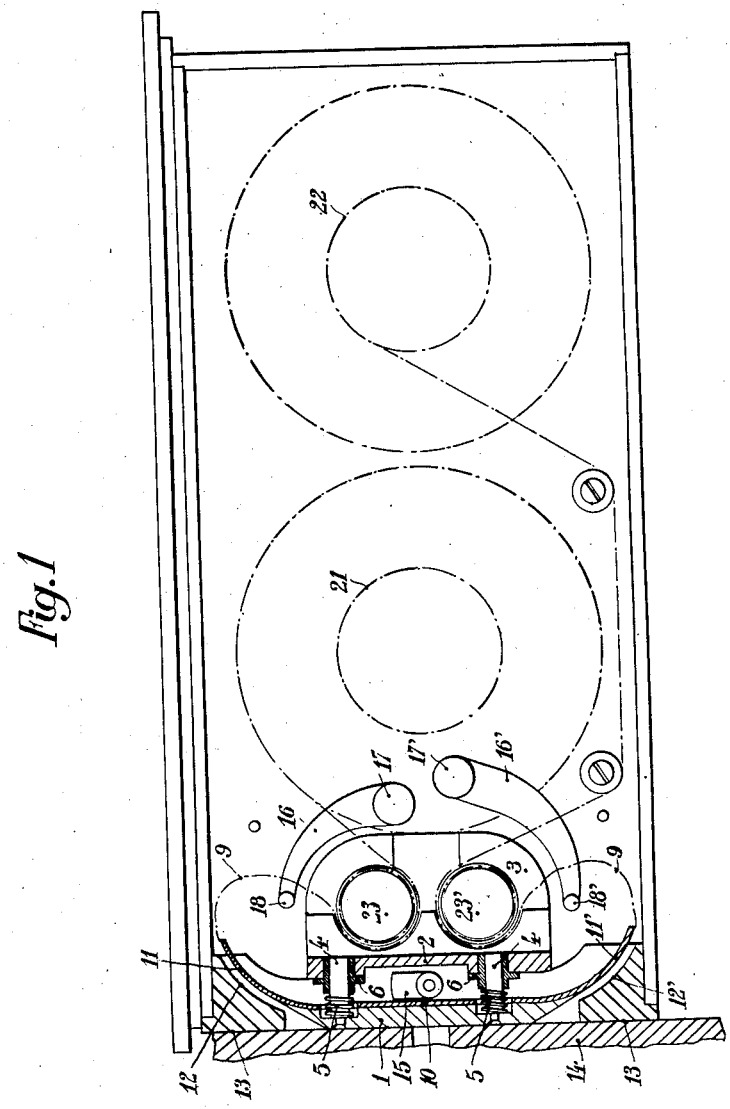
Figure 1 is a vertical sectional view of the loading box or magazine assumed to be in position in the camera and ready for use, the front side of the camera being assumed to be at the left of the figure.

Figures 3 and 4 respectively correspond to Figs. 1 and 2, the loading box however being supposed to be removed from the camera.

Figure 5 is a view of the front face of the loading box.

Figures 6 and 7 are enlarged side and front views respectively of the presser support performing the function of a light-tight shutter.

The presser 1 is yieldingly mounted with the aid of a pair of cylindrical supports 4 provided with springs 5 that slide in a pair of sleeves 6 secured to the member 2 rigid with the plate 3 on which the feed sprocket rollers 23, 23' are mounted; said plate 3 in turn is secured by means of screws to the wall of the loading box.

The presser 1 is secured on a plate 10 whose side edges 7 and the upper and lower extensions 11, 11' which are suitably curved, are yieldingly pressed by springs 5 against the inner frame of the window 8 provided in the front face 13 of the loading box through which emerges the presser 1.

In the released condition of the springs 5 the presser 1 projects to the outside of the front face 13 of the loading box and the film 9 is closely pressed between the curved extensions 11, 11' of the presser-carrying plate 10 and the corresponding curved surfaces 12, 12' of the inner wall of the front face of the loading box. Consequently, no light ray can then enter the loading box through the slits through which the film sections are led out of and into the loading box which are thus obtained by the curved extensions 11 and 11'. At the same time the side edges 7 of the plate 10 are pressed against the inner wall of the front face of the loading box, at the right and the left of the window 8, and provide for light-tightness in the lateral direction.

If in contrast thereto the springs are stressed due to the backward movement of the presser 1 urged by the pressure exerted thereupon by the wall 14 of the camera, such retraction of the presser being made possible by the rotation of the latch 15 whose outer arm 25 is swung as the loading box is set in position in the camera as will be explained later on, at that moment the plate 10 rigid with the presser 1 is moved aside and clears the slits between the surfaces 11—12 and 11'—12', whereafter the film can unwind freely.

The mechanism which enables the cameraman to automatically obtain the film loops whenever the reels have been replaced consists in a pair of flat levers 16 and 16' swingably mounted on pivots 17 and 17' and provided with fingers whose projections are visible at 18 and 18' in the figures. Said levers can assume two positions: the one shown in Fig. 3 which they will assume automatically when the loading box is removed from the camera and the one shown in Fig. 1 which is the shooting position and which is obtained likewise automatically as the loading box is set in position on the camera.

The first of said positions (Fig. 3) is used for replacing the reels of the loading box. The film 9 fed from the pay-off reel 21 runs over the feed sprocket roller 23 and thence about the finger 18 to enter the slit of the light-tight joint 11—12. It then passes in front of the presser 1, then through the joint 11'—12', round the finger 18', then runs about the feed sprocket roller 23 and is finally led to the take-up reel 22.

The second of said positions (Fig. 1) is the shooting position; the levers have rocked, the fingers have moved towards the front face of the loading box, thus releasing the film which has slackened while forming loops of the desired length.

Automatism in the motion of the levers 16 and 16' is obtained by means of small outer arms 19, 19' which are rocked by the action of stops arranged on the inner walls of the camera as the loading box is set in position. Small return springs (not shown) bring said levers back into the position shown in Fig. 3 as the loading box is removed.

In order to prevent the danger of tearing the front side of the film which might result from its contact with the edge 20 of the wall 14 of the camera (Fig. 3) as the loading box is slidden downwardly into the camera a pair of guides 24 and 24' are provided which have a suitable outline. Said guides at the beginning of the operation move the loading box away from said wall 14 and then allow it to come close to it again at the end of the stroke. By the action of springs which can be designed easily and are not shown the loading box once sunk home is secured in the exact position it must be in for the shooting operation.

Figs. 2 to 4 also enable to understand the automatic operation of the latch 15 which in the position shown in Fig. 3 prevents the presser 1 from moving backwards into the loading box whereas it allows it to do so in the position shown in Fig. 1. A stop arranged on the inner wall of the camera lifts the small lever 25 rigid with the latch 15 (position shown in Fig. 2) when the loading box is in position. A spring (not shown) brings back said small lever downwards when the loading box is removed. Various modifications may be made in this arrangement.

Besides, it is to be understood that the embodiments of the features of the invention described in the foregoing are given by way of exemplification and that various modifications, notably in the arrangement or the shape of the parts may be made therein without departing from the scope of the invention.

What we claim as our invention and desire to secure by Letters Patent is:

A detachable light-tight loading box for cinematographic cameras comprising a front face adapted to provide the rear wall of the gate through which the straight portion of the film is traveled, slits in said face through which the film is led into and out of the gate, means to secure said loading box to the rear face of a cinematographic camera adapted to provide the front wall of the gate, at least one film-feed sprocket roller, removable fingers between said sprocket roller and said slits over which the film can be stretched, yielding means acting upon said fingers to stretch the film and means to retract said fingers and form the desired loops once the loading box is in position on the camera.

ANDRÉ CLÉMENT COUTANT.
JACQUES MATHOT.

REFERENCES CITED

The following references are of record in the file of this patent:

UNITED STATES PATENTS

| Number | Name | Date |
|---|---|---|
| 1,865,107 | Howell | June 28, 1932 |
| 1,949,457 | Dina | Mar. 6, 1934 |
| 1,962,031 | Porter | June 5, 1934 |
| 2,000,286 | Howell | May 7, 1935 |
| 2,109,538 | Kindelmann | Mar. 1, 1938 |
| 2,277,695 | Foster | Mar. 31, 1942 |

FOREIGN PATENTS

| Number | Country | Date |
|---|---|---|
| 673,944 | Germany | Mar. 31, 1939 |